United States Patent [19]
Zabiak

[11] 4,365,035
[45] Dec. 21, 1982

[54] PIGMENTED JET PRINTING INK

[75] Inventor: Daniel M. Zabiak, Park Ridge, Ill.

[73] Assignee: A. B. Dick Company, Niles, Ill.

[21] Appl. No.: 40,117

[22] Filed: May 18, 1979

Related U.S. Application Data

[63] Continuation of Ser. No. 850,140, Nov. 10, 1977, abandoned.

[51] Int. Cl.³ .............................................. C08K 5/04
[52] U.S. Cl. .................................. 524/283; 523/106; 524/261; 524/296; 524/377; 524/423; 524/497; 524/560
[58] Field of Search ................. 260/29.6 T, 29.6 TA, 260/29.6 E, 29.6 H, 31.2 R, 33.2 R, 33.4 R; 106/22; 523/106; 524/261, 296, 337, 423, 497, 560, 283

[56] References Cited

U.S. PATENT DOCUMENTS

| | | | |
|---|---|---|---|
| 3,577,254 | 5/1971 | Petke | 260/42.54 |
| 3,790,523 | 2/1974 | Orvis | 260/42.54 |
| 3,846,141 | 11/1974 | Ostergren | 106/22 |
| 4,046,511 | 11/1977 | Sinclair | 260/42.54 |
| 4,172,064 | 10/1979 | Keller | 260/29.6 E |

*Primary Examiner*—J. Ziegler
*Attorney, Agent, or Firm*—McDougall, Hersh & Scott

[57] ABSTRACT

A pigmented ink composition for use in jet printing formulated of an aqueous or water-alcohol solvent system, a highly water dispersible white pigment limited to a particle size of less than 5 microns, a water dispersible resinous binder, a basic compound for maintaining a pH within the range of 7.5 to 9.5, and a plasticizer, and which may include in addition a coalescent agent and organic dye components for imparting color to the pigment.

24 Claims, No Drawings

PIGMENTED JET PRINTING INK

This is a continuation of application Ser. No. 850,140, filed Nov. 10, 1977, now abandoned.

This invention relates to high contrast jet printing inks and to a method and compositions for the preparation of same.

Because of the characteristics demanded of an ink composition for use in jet printing, it has been the practice of jet printing ink manufacturers to formulate jet printing ink compositions in the form of true solutions so as to avoid the presence of particulates that might clog the small passages and orifices through which the printing ink travels in printing by the jet technique. It is for this reason that others have sought to avoid the use of tinctorial agents other than soluble organic dyestuffs dissolved in a suitable ink vehicle having the proper characteristics from the standpoint of viscosity, electrical resistivity, surface tension, sonic viscosity and specific gravity.

Color is derived from the ink image by way of light subtraction. When the applied ink image is struck by white light, a portion of the white light is absorbed by the dyestuff, while another portion peculiar to the specific dye or dye mixture is transmitted to give the desired color. Since such inks are transparent, the color perceived is modified by the light which is reflected from the substrate onto which the ink is applied. Thus, inks of the type described have been limited in use to light colored reflective backgrounds. When printed onto black or other dark or highly colored backgrounds, the ink image is difficult to perceive.

It is an object of this invention to provide jet printing ink compositions which obviate the limitation which characterized jet printing inks heretofore produced and to provide a jet printing ink and a composition wherein the jet printing ink is characterized by high contrast to enable good readability when applied to black, dark or highly colored substrates, and it is a related object to provide a method and compositions for preparation of same.

The invention will hereinafter be described with reference to a typical formulation of an ink composition embodying the features of this invention as set forth in the following example.

EXAMPLE 1

|  | Percent by Weight |
| --- | --- |
| Titanium oxide, 50% dispersion in water | 15.0 |
| Acrylic resin (Lucidene 347-47% solids) | 16.0 |
| Ammonium hydroxide (28% NH3) | 1.0 |
| Isopropanol | 22.5 |
| Carbitol | 4.0 |
| Plasticizer | 0.37 |
| Defoamer | 0.01 |
| Water (deionized and filtered) | 41.12 |
|  | 100.00 |

PROCEDURE

The acrylic resin dispersion is first added to the titanium dioxide dispersion with stirring. To the formed slurry there is added the water, ammonium hydroxide, isopropanol, carbitol, plasticizer and defoamer. The composition is vigorously stirred for about 30 minutes and then passed through a high speed, high shear dispersion mill, such as a Kady mill or a colloid mill. The high shear breaks up any agglomerates and thoroughly wets out the pigment particles (titanium dioxide).

Any agglomerates and undispersed pigment particles remaining in the ink composition are removed by filtering. In practice, the composition was first filtered through a 20μ depth type filter and then through a 5μ depth type paper filter. Finally the ink composition was filtered through an absolute 5μ membrane filter.

The resulting ink composition had the following characteristics:

| Viscosity (25° C.) | = 8.1 cps |
| --- | --- |
| Electrical resistivity | = 400 ohm-cm |
| Surface tension | = 27.6 dynes/cm |
| Sonic velocity | = 1564 meters/sec. |
| Specific gravity | = 1.02 |

The ink composition of Example 1 was tested on a Model 9000 printer marketed by A. B. Dick Company at Niles, Ill. The ink printed well with good contrast on a black plastic substrate.

The Lucidene 347 is an acrylic resin emulsion containing 46-48% solids, as marketed by the Morton Chemical Corporation. Other easily dispersible or emulsifiable acrylic, methacrylic or alkylacrylic resin can be substituted in whole or in part for the acrylic resin in Example 1. It is desirable to make use of a resin emulsion or dispersion as distinguished from a resin solution since the latter, at equal loading, raises the viscosity to levels unsuitable for jet printing from the standpoint of stream breakoff and drop separation.

The resinous component, which may be referred to as a fixative resin can be selected of other highly water dispersible resins preferably of the thermoplastic type for service as a bonding agent. The amount of the resinous component can be varied within the range for maintaining the desired viscosity of the ink composition, but generally it will be employed in the weight ratio of 1 part by weight pigment to 0.50-2.0 parts by weight resin and preferably at about a 1 to 1 ratio.

The ammonium hydroxide is employed for pH control of the ink composition. The acrylic resin, in the example given above, maintains its best dispersion properties at pH 8-9. The ammonium hydroxide is also an ionizable material capable of imparting conductivity to the ink thus bringing the ink resistivity down below 2000 ohm-cm and into the operating range for proper ink drop charging for jet printing.

The ammonium hydroxide, upon evaporation from the drying ink deposit, allows the resin to achieve its maximum water resistance. Soluble metal bases would seriously impair the water resistance of the dried ink deposit.

The isopropanol functions in the ink composition to speed the drying of the jet applied ink and it also improves wettability of the ink for many types of surfaces to which the ink can be applied, such as plastic, paint, glass, metals and the like surfaces. Instead of isopropanol, other use can be made of other low boiling alcohols or other water miscible solvents which are compatible with the acrylic or other fixative resinous component. The amount of isopropanol or other miscible solvent will depend somewhat on the surface to be printed on and the ink drying rate desired. In general, the isopropanol or other solvent can be beneficially employed in an amount up to 40% by weight of the ink composition and preferably in an amount within the range of 15–30% by weight of the ink composition.

The carbitol operates in the system as an additional solvent and functions as a coalescent agent for the acrylic resin component. Instead of carbitol, when used, use can be made of other glycol ethers and their derivatives. When present, the amount should not exceed 10% by weight of the ink composition and it is preferred to restrict the amount to less than 5% and more preferably 1–4% by weight of the ink composition.

As the plasticizer use can be made of such materials as alkyl or aryl phthalates, preferably dibutyl phthalate, butyl phthalyl-butyl glycolate, and alkyl phosphates. The plasticizer, which aids water resistance and abrasion resistance of the image printed with the jet printing ink of this invention, can be employed in an amount within the range of 2–10% by weight of the resin content and preferably about 4–6% by weight of the resin.

The defoamer is employed solely for the purpose of reducing foaming during processing of the ink in both preparation and use. Any conventional defoamer can be used, compositions of which are well known to the skilled in the art. As the defoamer in Example 1, use was made of Dow-Corning's DB 31 silicone defoamer. Other commercial products that can be used include Foamkill 689 marketed by Crucible Chemical Corporation and Bubble Breaker 748 marketed by Witco Chemical Company. The desired effect is secured with only a very small amount of defoamer, such as up to 1% by weight of the ink composition and preferably 0.002–0.1% by weight of the ink composition.

It has been found that a jet printing ink composition having the desired characteristics for use with jet printers and which is characterized by being able to provide a white or highly contrasting image can be provided when the ink composition is formulated to contain a highly dispersible white inorganic pigment such as a white oxide of a metal and preferably titanium dioxide particularly of the rutile type. Such highly dispersible white pigment must be easily dispersible in water and of a size, in the ink composition, less than 5μ as demonstrated by the material remaining in the filtrate of ink composition of Example 1. It should be present in an amount of at least 5% by weight of the ink composition but it should not be present in an amount greater than 15% by weight. When an amount less than 5% by weight is employed in the ink composition, there is insufficient contrast, while an amount greater than 15% by weight increases the viscosity beyond the limits capable of use in jet printing.

Other pigments that are easily dispersible in water and capable of the desired particle size can be used, such as anatase titanium dioxides, barium sulfates, zinc oxides and the like although best results have been secured with titanium dioxide of the rutile type.

Dispersions suitable for use as the titanium dioxide component of the ink composition of Example 1 can be obtained as a commercial material such as marketed by Capitol Color and Chemical Corporation as 39-5-2217 white base. This 39-5-2217 base is a $T.O_2$ dispersion containing 60% $T.O_2$, 15% acrylic resin, and 4% emulsifier. It can be used in Example 1 by adjusting the solids with water to conform to the 50% dispersion in water as stated in Example 1. The pigment component can also be prepared by milling such as in a ball mill, roller mill or the like attrition mill, as illustrated by the following example of a composition for ball milling:

EXAMPLE 2

| | Percent by Weight |
|---|---|
| Solid titanium dioxide (DuPont R-900) | 50.0 |
| Alcosperse 109 | 1.0 |
| $NH_4OH$ (28% $NH_3$) | 1.0 |
| Defoamer | 0.25 |
| Ethylene glycol | 5.00 |
| Lucidene 347 (47% solids) | 24.00 |
| Potassium tripolyphosphate | 1.5 |
| Water | 17.25 |
| | 100.00 |

This mixture was ball milled for approximately 16 hours. Note a portion of the acrylic resin, as used in Example 1, was incorporated into the ball mill grind to facilitate pigment dispersion. About 20% resin to pigment ratio was used in the ball mill grind.

In the milled composition of Example 2, the Alcosperse 109 and the potassium tripolyphosphate function as dispersing agents for the titanium dioxide. The Alcospherse is a dispersant marketed by Alco Chemical Corporation.

The ethylene glycol component operates in the milling composition to retard evaporation of the slurry and to prevent drying. It will be understood that other materials, well known in the trade, can be used, and that other glycol such as propylene glycol, diethylene glycol and alkyl glycerols can be used instead of the ethylene glycol.

Rutile and other water dispersible titanium dioxides can be used instead of DuPont 900, such as DuPont 901, DuPont 931, and the like.

Jet ink compositon of a highly contrasting color other than white can be produced by modification to include with the white pigment particles of a soluble organic dye or an easily dispersible colored organic pigment as illustrated by the following example:

EXAMPLE 3

To the composition of Example 1, addition was made of an organic pigment such as Diarylide yellow X-9340, marketed by Hercules Chemical Corporation, either during the pigment dispersion operation or during the final ink mix operation prior to the final high shear dispersion. Final results of either method are comparable. 0.1–1.0% organic pigment can be used, depending on the tint desired. A contrasting yellow jet printing ink was produced and used to produce yellow images with a conventional jet printer.

In accordance with the practice of this invention the amounts of ingredients and types are controlled to provide a viscosity within the range of 5–25 cps and preferably within the range of 8–15 cps and an electrical resistivity no greater than 2000 ohm-cm and preferably less than 1000 ohm-cm.

The ink compositions embodying the features of this invention can advantageously be tinted to many desirable colors and the images produced are highly visible on black or other dark colored backgrounds. It has been observed that the inclusion of colored organic pigments in combination with the white dispersible metal oxide resulted in retardation of pigment settling and retardation or complete elimination of hard caking, as experienced after aging during extended periods of storage and redispersibility is markedly improved.

Some pigment settling will take place on prolonged storage but the ink is easily redispersible without the formation of excessive amounts of agglomerates. During use in an ink jet printer, the action of pumping the ink through the system is sufficient to maintain the desired dispersion to within 95% of the original after more than 100 days of operation, while auxiliary stirring of the ink in the ink reservoir maintains the dispersion over an extended period of time.

It will be understood that changes may be made in the details of formulation without departing from the spirit of the invention, especially as defined in the following claims.

I claim:

1. A water base jet printing ink composition for printing on black, dark, or highly colored substrates, the essential components of the water based jet printing ink consisting essentially of
    (1) a highly water dispersible white inorganic pigment having a particle size less than 5 microns,
    (2) a water dispersible thermoplastic acrylic resin,
    (3) a solvent selected from the group consisting of low boiling alcohol and water-alcohol mixture,
    (4) a basic compound dissolved in the solvent for adjustment of the pH to within the range of 7.5–9.5,
    (5) a plasticizer which imparts water resistance and abrasion resistance to the formed ink image, and
    (6) water.

2. A jet printing ink composition as claimed in claim 1, in which the pigment is a metal oxide.

3. A jet printing ink composition as claimed in claim 1, in which the pigment is titanium dioxide.

4. A jet printing ink composition as claimed in claim 1, in which the inorganic pigment is present in an amount within the range of 5–15% by weight of the ink composition.

5. A jet printing ink composition as claimed in claim 1, which includes a soluble organic dye.

6. A jet printing ink composition as claimed in claim 1, which includes an easily dispersible colored pigment.

7. A jet printing ink composition as claimed in claim 1, in which the weight ratio of the resin to pigment is within the range of 0.50 to 2.0.

8. A jet printing ink composition as claimed in claim 1, in which the weight ratio of the resin to pigment is substantially equal to 1.

9. A jet printing ink composition as claimed in claim 1, having a viscosity within the range of 5–25 centipoises, an electrical resistivity no greater than 2000 ohm-cm, suitable for printing on black, dark or highly colored substrates.

10. A jet printing ink composition as claimed in claim 1, in which the pH is within the range of 8.0 to 9.5.

11. A jet printing ink composition as claimed in claim 1, in which the basic compound is ammonium hydroxide.

12. A jet printing ink composition as claimed in claim 1, in which the viscosity is in the range of 5–25 centipoises.

13. A jet printing ink composition as claimed in claim 1, in which the solvent is isopropanol present in an amount up to 40% ty weight of the ink composition.

14. A jet printing ink composition as claimed in claim 1, in which the solvent is isopropanol present in an amount within the range of 15–30% by weight of the ink composition.

15. A jet printing ink composition as claimed in claim 1, in which the plasticizer is an alkyl or aryl phthalate selected from a group comprising dibutylphthalate, diphenylphthalate, dimethylphthalate, dicyclohexylphthalate, butylphthalyl butyl glycolate and butylbenzylphthalate.

16. A jet printing ink composition as claimed in claim 1, in which the plasticizer is employed in an amount within the range of 2–10% by weight of the resin content.

17. A jet printing ink composition as claimed in claim 1, in which the plasticizer is employed in an amount within the range of 4–6% by weight of the resin content.

18. A jet printing ink composition as claimed in claim 1 which includes a coalescent agent.

19. A jet printing ink composition as claimed in claim 1, which includes a coalescent agent selected from the group comprising glycol-ethers and their derivatives.

20. A jet printing ink as claimed in claim 18 in which the glycol-ether is diethylene glycol ethyl ether in an amount up to 10% by weight of the composition.

21. A jet printing ink as claimed in claim 18, in which the coalescent agent is present in an amount within the range of 1–4% by weight of the ink composition.

22. A jet printing ink as claimed in claim 1 which includes a defoamer.

23. A jet printing ink as claimed in claim 22 in which the defoamer is present in an amount up to 1% by weight of the ink composition.

24. A jet printing ink as claimed in claim 22 in which the defoamer is present in an amount within the range of 0.002 to 0.1% by weight of the ink composition.

* * * * *